Patented Nov. 1, 1949

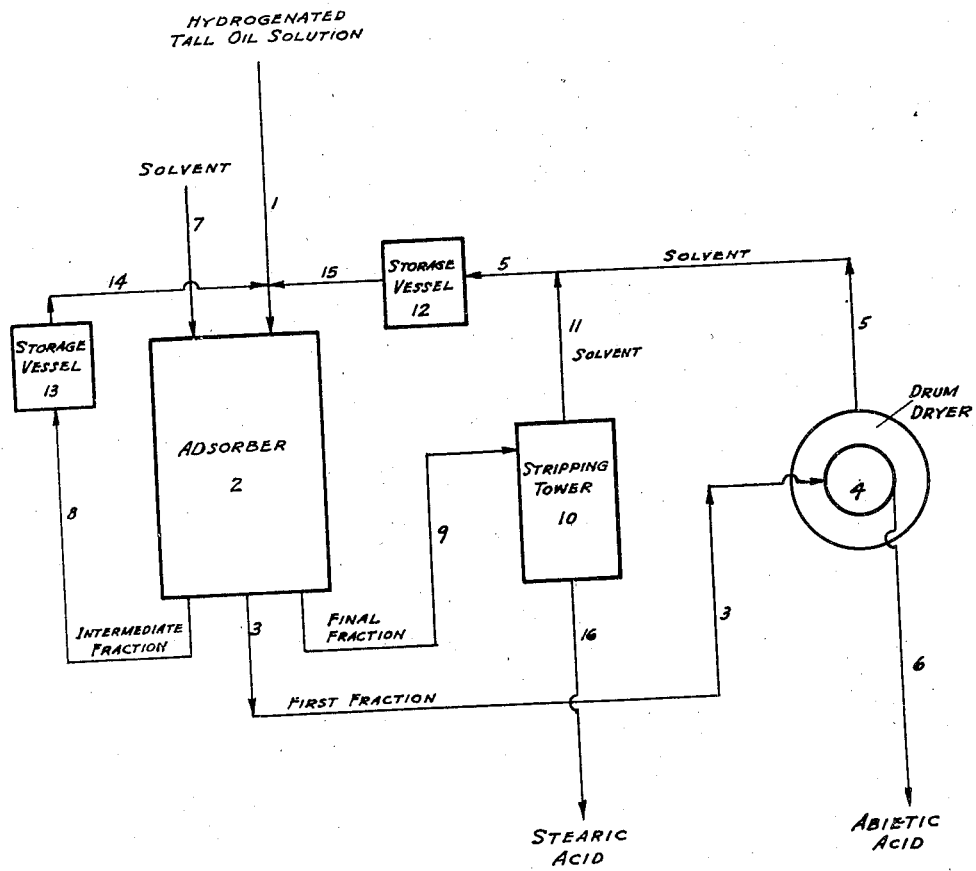

2,486,974

UNITED STATES PATENT OFFICE 2,486,974

RECOVERY OF STEARIC AND ABIETIC ACID FROM HYDROGENATED TALL OIL

Donald F. Othmer, Coudersport, Pa., and George Papps, New York, N. Y.

Application August 11, 1944, Serial No. 549,092

8 Claims. (Cl. 260—97.5)

This invention relates to the production of valuable products from tall oil and more particularly to a process for separating hydrogenated tall oil into its main constituents, i. e., fatty and resinic acids.

Tall oil is the resinous and fatty by-product obtained in the production of paper pulp from resin-bearing woods by the soda, sulfite and sulfate processes. The crude tall oil thus obtained is a disagreeable smelling dark brown viscous liquid consisting of a mixture of roughly equal proportions of unsaturated fatty acids and resin acid together with relatively small quantities of unsaponifiable matter, including sterols. The following are a few analyses of tall oil as reported in the literature:

Typical composition of tall oil

|  | (1) | (2) | (3) |
|---|---|---|---|
| Saponification Value | 150–160 | 159 | 174 |
| Acid Value | 160–170 | 168 | 178 |
| Iodine Value | [1] 150–180 | [2] 163 | [2] 161 |
| Unsaponifiables | 6–10% | 7 | 8 |
| Fatty Acids | 45–55% | 53.4 | 54.9 |
| Resin Acids | 40–55% | 38.8 | 35.8 |

[1] Wijs.
[2] Hanus.

The resin acids in tall oil consist principally of abietic acid and also unsaturated resin acids which are more unsaturated than abietic acid. The fatty acids include oleic, linoleic and linolenic acids.

The extensive use of tall oil industrially requires that it be refined and separated into fatty and resin fractions. This was realized at the beginning of the 20th century, only a few years after tall oil became a commercial product. To be used in paints, printing inks, for linoleum manufacture and many other purposes, the fatty acids must be substantially free of resin acids. While soap manufacturers incorporate some resin in laundry soaps, the preferred ratio of resin to fatty acids is much lower than that existing in tall oil so that for this use the resin acid content of tall oil is generally substantially reduced.

Many methods for refining tall oil and for separating the fatty and resin acids from tall oil and from each other have been proposed and patented. Some of these involve contacting with fuller's earth, vacuum distillation, selective esterification, selective splitting of fatty and resin acid soaps, selective extraction by solvents of tall oil soaps and esters and the selective splitting of tall oil glycerides. In some methods of separation the resin acids are destroyed. Thus, Blengsli (2,111,259) oxidized tall oil by air blowing and then separated the fatty acids by dissolving the oxidized tall oil in gasoline and filtering off the insoluble resin acid products.

Of the methods proposed for separating the fatty and resin acids of tall oil, fractional distillation has been the one most extensively used. Distillation, however, is expensive; the yields are poor because of decomposition, and separation is relatively inefficient. The last mentioned objection to the distillation method is a serious one for unless both rosin and the fatty acids can be recovered from tall oil in a pure and saleable form, such a method is economically unfeasable.

We have made the surprising discovery that if tall oil, purified and hydrogenated by any of the conventional methods to produce a product consisting essentially of stearic and abietic acids, is dissolved in a solvent and the solution thus prepared is subjected to selective adsorption by means of activated carbon, it is possible to separate and recover either one or both of these acids in a commercially pure form.

It is, therefore, the object of this invention to provide a process for recovering stearic and abietic acids from hydrogenated tall oil in a substantially pure and saleable form.

More particularly, it is an object of the present invention to recover substantially pure abietic acid and stearic acid in high yields by a process which involves dissolving the hydrogenated tall oil in a solvent and then subjecting the tall oil to selective adsorption.

Other objects will be apparent to those skilled in the art from the description and the appended claims.

Broadly stated, the invention comprises dissolving partially or completely hydrogenated tall oil in an organic solvent and then subjecting the dissolved tall oil to selective adsorption to separate abietic or stearic acid.

More specifically, the invention involves preparing a solution of hydrogenated tall oil in a solvent selected from the group consisting of petroleum ether and nitropropane-1, treating the solution thus obtained with an adsorbent to selectively adsorb stearic acid and then recovering the adsorbed material by eluting the adsorbent with additional quantities of solvent.

Stated in a still more limited form, the invention comprises preparing a solution of hydrogenated tall oil in one of the above solvents, filtering the solution thus prepared through an adsorbent to selectively adsorb stearic acid and substantial amounts of abietic acid while permitting the filtrate containing substantially pure abietic acid to pass through the adsorbent, eluting the adsorbed material with additional quantities of solvent to recover a mixture of abietic and stearic acids leaving substantial amounts of stearic acid in a relatively pure form on the adsorbent, continuing the eluting operation and thereby extracting the adsorbed stearic acid which may be recovered in a stripping tower or by evaporation on a drum dryer.

The invention also comprises filtering a solution of hydrogenated tall oil through an activated carbon adsorbent to fix the solution of tall oil thereon, eluting the adsorbed material to extract abietic acid in a substantially pure form, continuing the eluting operation to recover a mixed fraction including stearic and abietic acids while leaving a substantial amount of stearic acid in a relatively pure form on the adsorbent and thereupon removing the remaining stearic acid from the adsorbent by eluting with additional quantities of solvent.

The invention is illustrated but not limited by the following examples:

Example I 1 gram of hydrogenated tall oil having the following properties:

Acid value _____ 165
Iodine value (Hanus method) _____ 75.4
Melting point _____°C__ 54
Resin acids _____per cent__ 29.6 was dissolved in 25 milliliters of nitropropane-1 and then slowly filtered in an adsorbent column consisting of ¾" glass tubing containing 10 grams of finely divided activated carbon to deposit therein the solution of hydrogenated tall oil. 150 milliliters of fresh solvent (nitropropane-1) was introduced into the top of the column and then reduced pressure was applied to facilitate the percolation of the solvent through the adsorbent. The filtrate obtained was evaporated to dryness and it was found by analysis that 78.4% of the abietic acid adsorbed by the column of adsorbent had been recovered and that it was 99.5% pure.

An additional 250 milliliters of nitropropane-1 was passed through the adsorbent and an intermediate fraction was collected containing 21.7% abietic acid and 12.8% stearic acid, calculated on the basis of the abietic and stearic acid content of the hydrogenated tall oil adsorbed.

The material left in the column as a result of the above operations included stearic acid and very small quantity of unsaponifiable material. The stearic acid and then the unsaponifiable material were washed through and out of the column by means of about 600 milliliters of additional solvent and both materials were recovered by evaporating the separate filtrates. The stearic acid obtained was substantially 100% pure and represented 87% by weight of the stearic acid adsorbed in the initial step of the process.

The abietic and stearic acids thus recovered were white and were in a substantially pure and saleable form.

Example II 1 gram of hydrogenated tall oil was dissolved in 25 milliliters of isopropanol and slowly filtered in an adsorbent column consisting of ¾ inch glass tubing containing about 22 grams of activated carbon to fix the hydrogenated tall oil solution on the adsorbent. The adsorbed material was thereupon eluted with 80 milliliters of additional solvent to produce a filtrate containing abietic acid. This filtrate was evaporated to dryness and abietic acid of 99.3% purity was obtained in an amount corresponding to 71.4% by weight of the abietic acid contained in the hydrogenated tall oil deposited on the adsorbent.

Example III 1 gram of hydrogenated tall oil dissolved in 25 milliliters of petroleum ether-1 was allowed to slowly percolate through about 16 grams of adsorbent carbon contained in a column similar to that employed in the foregoing examples to fix all of the hydrogenated tall oil solution on the adsorbent. 190 milliliters of petroleum ether was then passed through the adsorbent to produce a filtrate containing abietic acid, which was evaporated to yield a product of 99.5% purity.

The remainder of the adsorbed hydrogenated tall oil included a very small amount of unsaponifiable material and a mixture of stearic and abietic acids, which increased in stearic acid concentration towards the top of the column. This material was eluted with 2.5 liters of petroleum ether-1 to recover a mixture of stearic and abietic acids, leaving some unsaponifiable material and the major proportion of the stearic acid content of the tall oil upon the surface of adsorbent. The stearic acid and the unsaponifiable material were successively recovered by eluting the adsorbed material with additional solvent and evaporating the separate filtrates to dryness. The stearic acid thus obtained was substantially free of abietic acid and other impurities.

In order that those skilled in the art may even more fully appreciate the scope of the invention, reference is made to the accompanying drawing which illustrates the flow sheet of our process.

In accordance with the flow sheet, hydrogenated tall oil having an acid number of 165, an iodine value of 75.5, a melting point of about 54° C. and a resin acid content of about 29.6% is dissolved in nitropropane-1 and introduced by pipe 1 into adsorber 2 containing activated carbon such as Darco G-60. The solution is slowly filtered, preferably under reduced pressure, to produce a filtrate consisting of abietic acid dissolved in nitropropane-1. If desired, additional solvent may be added by means of pipe 7 to obtain a more effective separation of the abietic acid, but as a rule this is unnecessary. The first fraction including one or more filtrates, depending upon the number of elutions used to separate the abietic acid, leaves the adsorber by pipe 3 and is conducted to a drum dryer 4 where substantially pure abietic acid is recovered and discharged by outlet 6 into a suitable container. The solvent evaporated by the drum dryer is conveyed by pipe 5 to a storage vessel 12 to be subsequently recycled to the adsorber by means of pipes 15 and 1.

More nitropropane-1 is then fed into the adsorber by means of pipe 7 and the solvent is allowed to gradually filter through the activated carbon to produce an intermediate fraction consisting essentially of stearic and abietic acids. This fraction leaves the adsorber by means of pipe 8 and is conveyed to a storage vessel 13 from which it may be recycled by pipes 14 and 1 to the adsorber.

Additional nitropropane-1 is charged into the adsorber by means of pipe 7 and a final fraction consisting of substantially pure stearic acid is obtained, which fraction is conducted by pipe 9 into a stripping tower 10, wherein the solvent is evaporated and led by means of pipes 11 and 5 to storage vessel 12 for reuse in the process. The stearic acid is recovered and discharged through outlet 16 into a suitable container.

The above procedure leaves a small quantity of unsaponifiable material in adsorber 2 which may be recovered by eluting the adsorbent with further quantities of solvent and then evaporating the latter from the extracted material.

If desired, the concentration of the hydrogenated tall oil solution and/or the depth and area of the adsorbent column may be adjusted so that all of the hydrogenated tall oil solution is retained by the column. If that is done, then fresh solvent is used to wash out all four fractions.

Numerous solvents may be satisfactorily employed in our selective adsorption process. Examples of these are benzene, toluene, xylene, hexane, heptane, iso-octane, petroleum ether-1, petroleum ether-2, Solvesso-1, Solvesso-2, methanol, ethanol, n-propanol, primary butanol, secondary butanol, tertiary butanol, methyl acetate, ethyl acetate, butyl acetate, methyl ethyl ketone, dioxane, ethylene dichloride, chloroform, carbon tetrachloride, nitromethane, nitroethane, nitropropane-1 and nitropropane-2. Mixtures of two or more of these solvents may also be used. Of this group of solvents, nitropropane-1 and petroleum ether-1 are the most efficient as by their use it is possible to obtain an essentially complete separation of both abietic and stearic acid.

Moreover, it is within the scope of our invention to employ one solvent for fixing the hydrogenated tall oil on the adsorbent, another to separate the abietic and stearic acids and still another to wash out the stearic acid and the unsaponifiable material, but for obvious reasons the preferred procedure is to use the same solvent or solvent mixture throughout the process.

The above description has been limited to the use of activated carbon, but it should be clearly understood that other materials such as silica gel, bleaching earths, fibrous clays, aluminum oxide, etc. are also within the scope of our invention.

In general when hydrogenated tall oil is subjected to selective adsorption, the efficiency or sharpness of the separation of stearic and abietic acid depends principally upon the solvent used, although such factors as the adsorbent and the temperature at which the adsorption takes place should also be considered.

In selecting an adsorbent and a solvent for use in our process, particularly solvents and adsorbents other than those specifically mentioned herein, it is desirable to run a preliminary test to ascertain the adsorbent-solvent combination giving the most efficient selective adsorption as some adsorbents are more effective with one solvent than another.

As to the area and depth of the adsorbent, this will vary with the particular adsorbent or the adsorbent-solvent combination used. The depth and area may be such that in a single filtration operation the major proportion of the abietic acid contained in the hydrogenated tall oil passes through and out of the adsorbent column, leaving on the adsorbent a mixture of stearic and abietic acids in which the concentration of the former increases from the bottom towards the top of the column until a point is reached where the stearic acid is in a substantially pure condition. The adsorbed material is then treated in the manner described in connection with the flow sheet to recover stearic acid and an intermediate fraction may be reworked in the next batch.

The area and depth of the adsorbent may also be adjusted so that, with or without correlating the concentration of the hydrogenated tall oil solution, all of the tall oil solution will be adsorbed in the coumn. The adsorbed material under these circumstances is then treated with fresh solvent to recover an initial fraction containing substantially pure abietic acid, a third fraction including stearic acid, a fourth fraction containing unsaponifiable material and a second fraction comprising a mixture of the two acids, which mixture may be returned to the process.

The condition of the adsorbent, whether it is wet or dry, is also a factor in determining whether the hydrogenated tall oil solution is entirely retained by the adsorbent or not. For example, if a column of adsorbent is employed which has been wet with the solvent used to dissolve the hydrogenated tall oil, then when all of the hydrogenated tall oil solution has been introduced into the column, some of the abietic acid dissolved in the solvent will pass through the adsorbent. If, however, a dry adsorbent is employed, then the solvent containing the hydrogenated tall oil is entirely retained by the column, provided, of course, the volume and area of the adsorbent are properly correlated with the concentration and the volume of the hydrogenated tall oil solution. Under these conditions nothing comes through the adsorbent column and further additions of solvent are then required to remove the various fractions.

The temperature at which selective adsorption is carried out affects the efficiency of the separation of stearic acid from abietic acid. As in most adsorption processes, the lower the temperature the greater is the adsorption efficiency. Thus the adsorption of stearic acid increases markedly with lower temperatures while the adsorption of abietic acid increases only slightly, thereby making possible an efficient separation of these two acids. The temperature range at which optimum results are obtainable is from 0° C. to 15° C., however satisfactory results are also possible at temperatures up to 35° C. Still higher temperatures are also within the scope of our invention, but we prefer to operate within the above temperature range as the adsorption efficiency decreases noticeably when a temperature of 35° C. is exceeded.

In carrying out the present selective adsorption process, either negative or positive pressure may be applied to the system to facilitate the flow of the hydrogenated tall oil solution or the eluting solvent through the adsorbent.

By employing a plurality of adsorbent towers or filters it is possible to operate the present process continuously. For example, if three adsorbent towers are employed, a solution of hydrogenated tall oil in one of the above solvents is continuous'y introduced into the first tower until substantially pure abietic acid no longer passes through the adsorbent, whereupon the flow of the solution is diverted to the second tower. During the time that abietic acid flows from the second tower fresh and/or recycled solvent is passed through the first tower until an intermediate fraction is washed out leaving stearic acid on the adsorbent. Fresh and/or recycled solvent is then passed into the top of the second tower to remove an intermediate fraction including abietic and stearic acid leaving stearic acid deposited upon the adsorbent in this tower. While this is taking place, fresh and/or recycled solvent is introduced into the top of the first tower to wash out the adsorbed stearic acid and simultaneously therewith the flow of the hydrogenated tall oil solution is diverted from the second to the third adsorbent tower. As soon as the abietic acid solution flowing from the third tower begins to indicate an increasing stearic acid content, the hydrogenated tall oil solution is diverted to the first tower and the cycle is continuously repeated. At the beginning of the second cycle, while the hydrogenated tall oil solution is being charged into the first tower, fresh and/or recycled solvent is fed into the top of the second and third towers to wash out the stearic acid retained by the second tower and to remove an intermediate fraction containing abietic and stearic acids from the third tower. As soon as the abietic acid flowing from the first tower begins to show an increasing stearic acid content, the hydrogenated tall oil solution is diverted to the second tower to yield further quantities of abietic acid. While this operation is in progress, fresh and/or recycled solvent is introduced into the first tower to remove an intermediate fraction and also into the third tower to wash out the stearic acid contained therein. The above procedure is continuously repeated to yield abietic and stearic acid in high yields and in a commercially saleable form.

The stearic and abietic acids flowing from the various adsorbers are continuously evaporated in a stripping tower or on a drum dryer. These operations yield substantially pure abietic acid and stearic acid containing small amounts of unsaponifiable material including sterols. The stearic acid may be separated from the unsaponifiable material by saponifying the stearic acid, extracting the soap thus formed and then regenerating the acid by acidification. Other known methods for accomplishing this result may also be employed if desired.

The solvent evaporated from the abietic and stearic acid fractions is recycled to the various adsorbers and reused in the process alone or in combination with fresh solvent.

The intermediate fractions may be separately treated or they may be combined with the hydrogenated tall oil solution being fed to the adsorbers and reused in a continuous manner.

As an alternative to the above methods of carrying out the present invention, the adsorbent may be added to and intimately mixed with the solution of hydrogenated tall oil to form a slurry in which the tall oil is deposited upon the adsorbent. The slurry is then filtered and the adsorbent retained on the filter is eluted with additional quantities of solvent to separate an abietic acid fraction, and intermediate fraction including abietic and stearic acids and a third fraction consisting of substantially pure stearic acid, leaving a residue of unsaponifiable material deposited upon the adsorbent. This unsaponifiable material is recovered as a fourth and final fraction by eluting the adsorbent with additional solvent and evaporating the solution thus obtained to dryness. The initial, third and final fractions are evaporated to recover the abietic acid, stearic acid and the unsaponifiable material and the intermediate fraction is either treated separately or is combined with a solution of hydrogenated tall oil for reuse in the production of further quantities of slurry.

When operating the above alternative method in a continuous manner, a plurality of filters (3 or more) are employed and the stearic acid and unsaponifiable material are washed through and out of the adsorbent together. This gives a product of the desired purity for most purposes, but if desired, the stearic acid may be separated from the unsaponifiable material in the manner indicated above. It is, of course, understood that other well known methods for accomplishing this result may also be employed.

Although the foregoing description has been restricted to the selective adsorption of hydrogenated tall oil, our invention is also applicable to the treatment of related materials containing both straight chain aliphatic acids and ring chain acids and derivatives thereof.

While we have specifically described the preferred embodiments of our invention, it is to be understood that the invention is not limited thereto but may be otherwise embodied and practiced within the scope of the following claims.

What we claim is:

1. The process of recovering stearic acid from a hydrogenated tall oil consisting essentially of a mixture of abietic and stearic acids which comprises introducing an organic solvent solution of said hydrogenated tall oil into an activated carbon adsorbent column to deposit thereon said solution, eluting said deposited material with an organic solvent to extract abietic acid in a substantially pure form leaving a mixture of stearic and abietic acids on said adsorbent column, continuing said eluting operations to recover a mixed fraction including stearic and abietic acids while leaving a substantial amount of stearic acid in a relatively pure form on said adsorbent column, and thereupon removing the remaining stearic acid from said column by eluting with an organic solvent, said eluting operations being carried out at a temperature of from 0° C. to 35° C.

2. The process defined in claim 1, wherein nitropropane-1 is the organic solvent employed.

3. The process defined in claim 1, wherein petroleum ether is the organic solvent employed.

4. The process defined in claim 1, wherein isopropanol is the organic solvent employed.

5. The process defined in claim 1, wherein the eluting operations are carried out at a temperature of about 15° C.

6. The process of recovering stearic acid from hydrogenated tall oil consisting essentially of a mixture of abietic and stearic acids, which comprises introducing an organic solvent solution of said hydrogenated tall oil into an activated carbon adsorbent column to deposit thereon said solution, eluting said deposited material with an organic solvent to extract abietic acid in a substantially pure form leaving a mixture of stearic and abietic acids on said adsorbent column, continuing said eluting operations to recover a mixed fraction including stearic and abietic acids while leaving a substantial amount of stearic acid in a relatively pure form on said adsorbent column and thereupon removing the remaining stearic acid from said column by eluting with an organic solvent, said hydrogenated tall oil and said activated adsorbent carbon being employed in a ratio of 1 part by weight of hydrogenated tall oil to about 10 parts by weight of adsorbent carbon and said eluting operations being carried out at a temperature of from 0° C. to 35° C.

7. The process of recovering stearic acid from hydrogenated tall oil consisting essentially of a mixture of abietic and stearic acids, which comprises introducing on organic solvent solution of said hydrogenated tall oil into an activated carbon adsorbent column to deposit thereon said solution, eluting said deposited material with an organic solvent to extract abietic acid in a substantially pure form leaving a mixture of stearic and abietic acids on said adsorbent column, continuing said eluting operations to recover a mixed fraction including stearic and abietic acids while leaving a substantial amount of stearic acid in a relatively pure form on said adsorbent column and thereupon removing the remaining stearic acid from said column by eluting with an organic solvent, said hydrogenated tall oil and said activated adsorbent carbon being employed in a ratio of 1 part by weight of hydrogenated tall oil to about 16 parts by weight of adsorbent carbon and said eluting operations being carried out at a temperature of from 0° C. to 35° C.

8. The process of recovering stearic acid from hydrogenated tall oil consisting essentially of a mixture of abietic and stearic acids, which comprises introducing an organic solvent solution of said hydrogenated tall oil into an activated carbon adsorbent column to deposit thereon said solution, eluting said deposited material with an organic solvent to extract abietic acid in a substantially pure form leaving a mixture of stearic and abietic acids on said adsorbent column, continuing said eluting operations to recover a mixed fraction including stearic and abietic acids while leaving a substantial amount of stearic acid in a relatively pure form on said adsorbent column and thereupon removing the remaining stearic acid from said column by eluting with an organic solvent, said hydrogenated tall oil and said activated adsorbent carbon being employed in a ratio of 1 part by weight of hydrogenated tall oil to about 22 parts by weight of adsorbent carbon and said eluting operations being carried out at a temperature of from 0° C. to 35° C.

DONALD F. OTHMER.
GEORGE PAPPS.

REFERENCES CITED

The following references are of record in the file of this patent:

UNITED STATES PATENTS

| Number | Name | Date |
| --- | --- | --- |
| 2,280,842 | Oliver et al. | Apr. 28, 1942 |
| 2,305,498 | Segessemann | Dec. 15, 1942 |

OTHER REFERENCES

Chemical Abstracts, vol. 33, 1939, p, 6073$^8$.

Wafer et al., Tall Oil for the War Effort from Paper Trade Journal, vol. 117, No. 4, July 22, 1943, pp. 26–31.